(12) United States Patent
Han et al.

(10) Patent No.: US 10,531,124 B1
(45) Date of Patent: Jan. 7, 2020

(54) MULTI-STAGE CODING BLOCK PARTITION SEARCH

(71) Applicant: GOOGLE LLC, Mountain View, CA (US)

(72) Inventors: Jingning Han, Santa Clara, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/016,980

(22) Filed: Jun. 25, 2018

(51) Int. Cl.
| | |
|---|---|
| H04N 19/66 | (2014.01) |
| H04N 19/119 | (2014.01) |
| H04N 19/176 | (2014.01) |
| H04N 19/96 | (2014.01) |
| H04N 19/192 | (2014.01) |
| H04N 19/50 | (2014.01) |

(52) U.S. Cl.
CPC .......... *H04N 19/66* (2014.11); *H04N 19/119* (2014.11); *H04N 19/176* (2014.11); *H04N 19/192* (2014.11); *H04N 19/50* (2014.11); *H04N 19/96* (2014.11)

(58) Field of Classification Search
CPC ...... H04N 19/66; H04N 19/50; H04N 19/192; H04N 19/176; H04N 19/119; H04N 19/96
See application file for complete search history.

(56) References Cited

U.S. PATENT DOCUMENTS

| | | | |
|---|---|---|---|
| 2013/0034154 A1* | 2/2013 | Song .................. | H04N 19/176 375/240.03 |
| 2019/0045210 A1* | 2/2019 | Guermazi ............. | H04N 19/51 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.

(Continued)

*Primary Examiner* — Tracy Y. Li
(74) *Attorney, Agent, or Firm* — Young Basile Hanlon & MacFarlane, P.C.

(57) ABSTRACT

Multi-stage coding block partition search is disclosed. A method includes selecting a partition-none partition type and a partition-split partition type for predicting the block, determining a first cost of predicting the block using the partition-none partition type, and determining a second cost of predicting the block using the partition-split partition type. The partition-none partition type and the partition-split partition type are selected from a set of partition types that includes the partition-none partition type, the partition-split partition type, and third partition types. The method also includes, on condition that the result meets a criterion, determining a respective encoding cost corresponding to at least some of the third partition types; selecting a selected partition type corresponding to a minimal cost amongst the partition-none partition type and the at least some of the third partition types; and encoding, in a compressed bitstream, the selected partition type.

20 Claims, 12 Drawing Sheets

(56) References Cited

OTHER PUBLICATIONS

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

MULTI-STAGE CODING BLOCK PARTITION SEARCH

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

One aspect of the disclosed implementations is a method for predicting a block of a video frame. The method includes selecting a partition-none partition type and a partition-split partition type for predicting the block, determining a first cost of predicting the block using the partition-none partition type, and determining a second cost of predicting the block using the partition-split partition type. The partition-none partition type and the partition-split partition type are selected from a set of partition types that includes the partition-none partition type, the partition-split partition type, and third partition types. The partition-split partition type partitions the block into equally sized square sub-blocks. The method also includes, on condition that the result meets a criterion, determining a respective encoding cost corresponding to at least some of the third partition types; selecting a selected partition type corresponding to a minimal cost amongst the partition-none partition type and the at least some of the third partition types; and encoding, in a compressed bitstream, the selected partition type.

Another aspect is an apparatus for predicting a block of a video frame. The apparatus includes a memory and a processor. The processor is configured to execute instructions stored in the memory to select a partition-none partition type and a partition-split partition type for predicting the block; determine a first cost of predicting the block using the partition-none partition type; and determine a second cost of predicting the block using the partition-split partition type. The partition-none partition type and the partition-split partition type are selected from a set of partition types that includes the partition-none partition type, the partition-split partition type, and third partition types. The partition-split partition type partitions the block into equally sized square sub-blocks. The processor is also configured to execute instructions stored in the memory to determine a result of comparing the first cost and the second cost; and on condition that the result meets a criterion, determine a respective encoding cost corresponding to at least some of the third partition types, and select a selected partition type corresponding to a minimal cost amongst the partition-none partition type and the at least some of the third partition types.

Another aspect is a method for predicting a block of a video frame. The method includes determining a partition type, from partition types including a partition-none partition type, a partition-split partition type, and third partition types, for predicting the block; and encoding, in a compressed bitstream, the partition type. Determining a partition type includes determining a first coding cost of the block associated with the partition-none partition type; determining a second coding cost of the block associated with a skip-level recursive partitioning; and, on condition that the first coding cost is smaller than the second coding cost, determining respective coding costs of encoding the block using at least some of the third partition types and the partition-split partition type, and selecting the partition type corresponding to a minimal coding cost from among the first coding cost and the respective coding costs.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
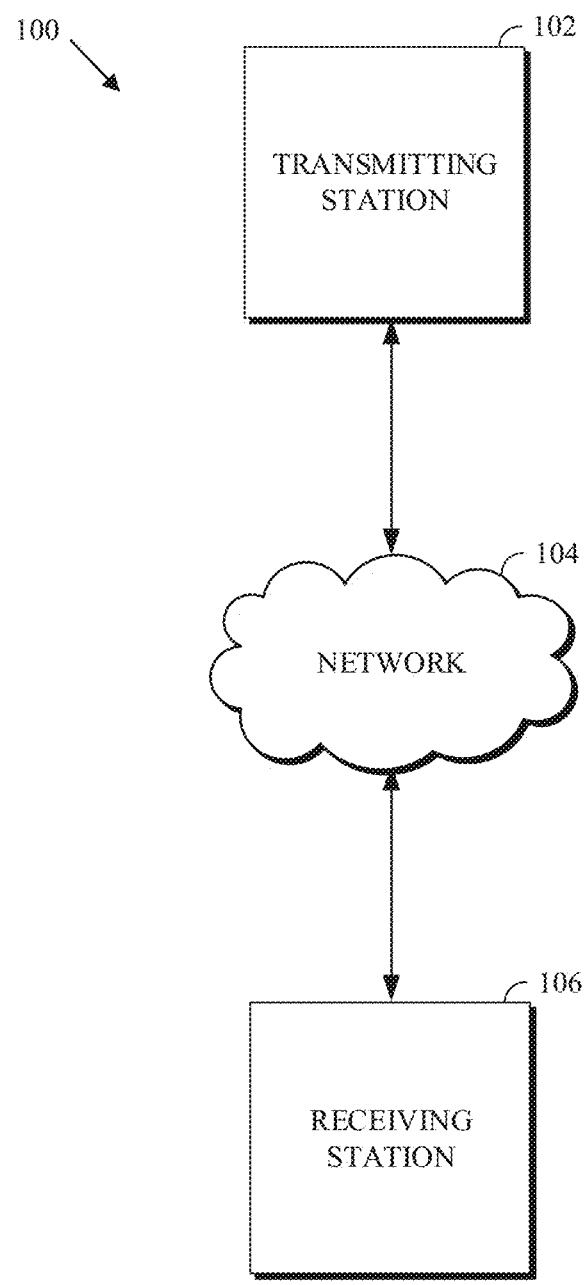
FIG. 1 is a schematic of a video encoding and decoding system.

As mentioned above, compression schemes related to coding video streams can include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities is referred to as intra-prediction. Intra-prediction techniques exploit spatial redundancy within a video frame for compression. Specifically, an image block (e.g., a block of a still image or a block of a frame of a video) can be predicted using neighboring coded pixels. An image block being coded is referred to as a current block. The neighboring pixels are typically pixels of reconstructed blocks of previously coded blocks. The previously coded blocks are blocks that precede the current block in a scan order of blocks of the image. For example, in a raster scan order, the reconstructed blocks are located on the top boundary and the left boundary, but outside, of the current block.

Encoding using temporal similarities is referred to as inter-prediction. Inter-prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter-prediction is referred to herein as an inter-predictor or an inter-predictor block.

As mentioned above, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization operation.

Identifying the residual involves prediction (as further described below) using, for example, intra-prediction and/or inter-prediction. As further described below with respect to FIG. 7, prediction is performed at a coding block level. A coding block can be partitioned (e.g., split) into one or more prediction blocks according to a partition type. A partitioning (according to a partition type) that optimally captures the content (e.g., signal) characteristics of the coding block is used. An optimal partitioning is a partitioning that can result in a best (i.e., minimal) rate-distortion value for the coding block.

As further explained below, a frame of video (or an image) can be divided into blocks (referred to as superblocks or coding block trees) of largest possible coding block sizes. The largest possible coding block size can be 128×128, 64×64, or other largest possible coding block size. Each superblock is processed (e.g., encoded) separately from the coding of other superblocks.

A superblock is encoded based on a partitioning (i.e., into coding blocks) that results in an optimal rate-distortion value for the superblock. A rate-distortion value refers to a ratio that balances an amount of distortion (e.g., a loss in video quality) with a rate (e.g., a number of bits) for encoding a coding block of the superblock. As such, the superblock may be recursively partitioned into coding blocks to determine the optimal rate-distortion value of the superblock. The rate-distortion value of the superblock can be the sum of the rate-distortion values of the constituent coding blocks of the superblock. A partitioning can include only one coding block that corresponds to the superblock itself (i.e., no further partitioning of the superblock). Partitioning of a superblock into coding blocks is illustrated with respect to FIG. 7.

A coding block can be partitioned into one or more prediction blocks. The coding block can be partitioned into prediction blocks according to a partition type. Several partition types may be available. Examples of partition types are described with respect to FIGS. 8A-8B.

To determine an optimal partition (e.g., a partition that results in the minimum rate-distortion value) of a coding block, an encoder can perform a partition search. For example, for each available partition type, the encoder can partition the coding block, according to the partition type, into respective prediction blocks. For each partition type, each prediction block is encoded according to all possible intra-prediction modes and inter-prediction modes to determine the optimal prediction mode for the prediction mode.

As an illustrative example, assume that only two partition types are available, namely, a non-partition type and a vertical-partition type, and that the superblock is of size N×N (e.g., 128×128). The non-partition type corresponds to using a prediction block of size N×N (i.e., 128×128). The vertical-partition type corresponds to splitting the superblock into two prediction blocks, each of size N/2×N (i.e., 64×128).

A first minimum rate-distortion value corresponding to the non-partition type is determined. The first minimum rate-distortion value can be the minimum rate-distortion value that results from predicting the block using each of the possible intra- and inter-prediction modes. A second minimum rate-distortion value corresponding to the vertical-partition type is determined. The second minimum rate-distortion value can be the sum of the minimum rate-distortion values corresponding to each of the N/2×N prediction blocks. The optimal partition type of the superblock is that partition that results in the minimal rate-distortion values amongst the first minimum rate-distortion value and the second minimum rate-distortion value.

A codec (e.g., an encoder) can have available multiple partition types. More partition types can be used to better fit the characteristics of the block signal. For example, using the partition types described with respect to FIG. 8B (herein referred to as "extended partitioning types") can provide compression performance gains over using only the partition types described with respect to FIG. 8A. For example, 3% performance gains have been observed when partition types that partition a coding block into two square and one rectangular sub-blocks are used; and an additional 1% performance gain has been observed when additionally using partition types that partition a coding block into four rectangular prediction units.

The improved compression gains, however, result in higher encoder complexity. Encoder complexity is a function of the number of partition types. Higher encoder complexity is due to the more extensive partition search associated with higher partition types. For example, an encoder that has available 10 partition types may take 2.5 times longer to determine (e.g., by performing a partition search) an optimal partition type than an encoder that has four partition types.

Implementations according to this disclosure can balance the performance gains associated with an increased number of partition types with the time required (i.e., by an encoder) to perform a partition search. A multi-stage coding block partition search can be used to reduce the search space (i.e., the number of partition types to be checked) while retaining the compression gains associated with the increased number of partition types. At each stage, some of the partition types are eliminated (i.e., not checked) and, accordingly, predictions based on the eliminated partition types are not performed. The multi-stage coding block partition search has been observed to improve coding performance (i.e., computation time associated with partition search) by 40% at a minor compression loss of 0.15%.

Multi-stage coding block partition search of coding blocks is described herein first with reference to a system in which the teachings may be incorporated.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
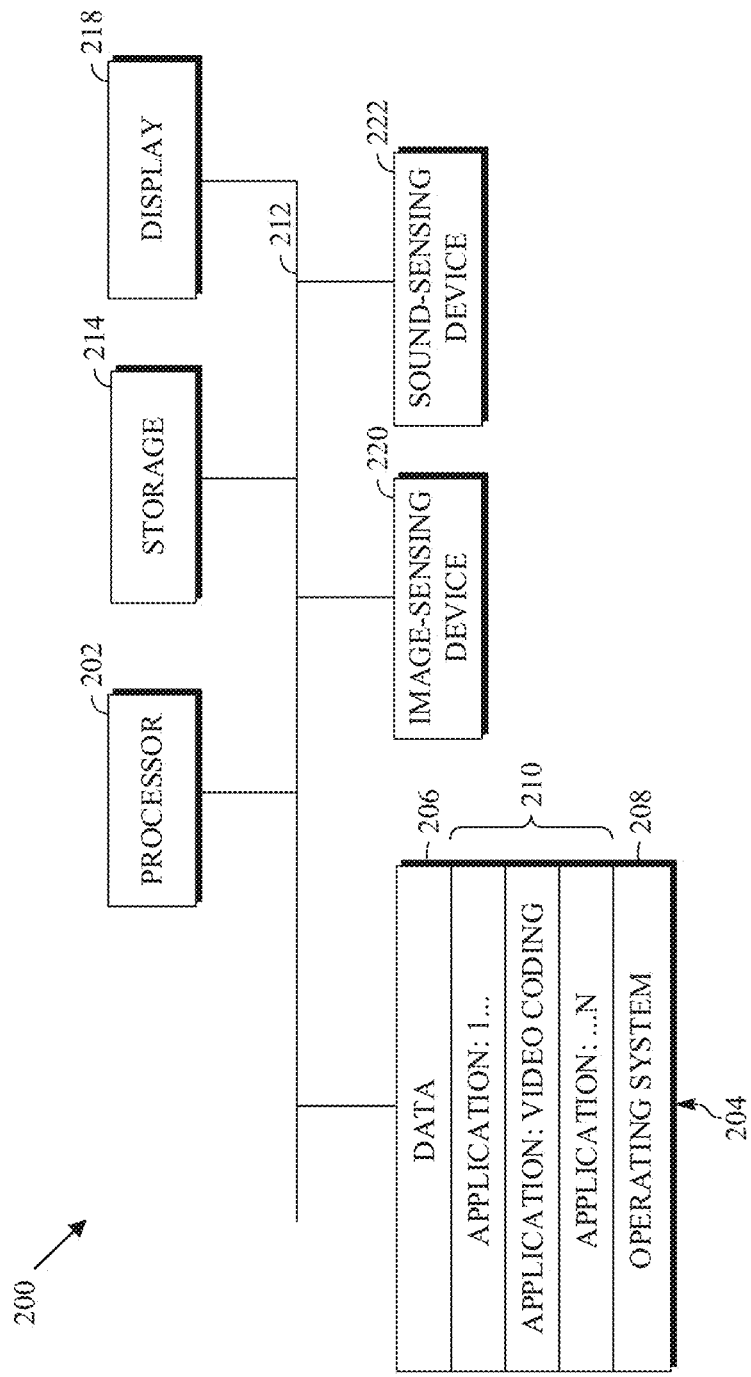
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
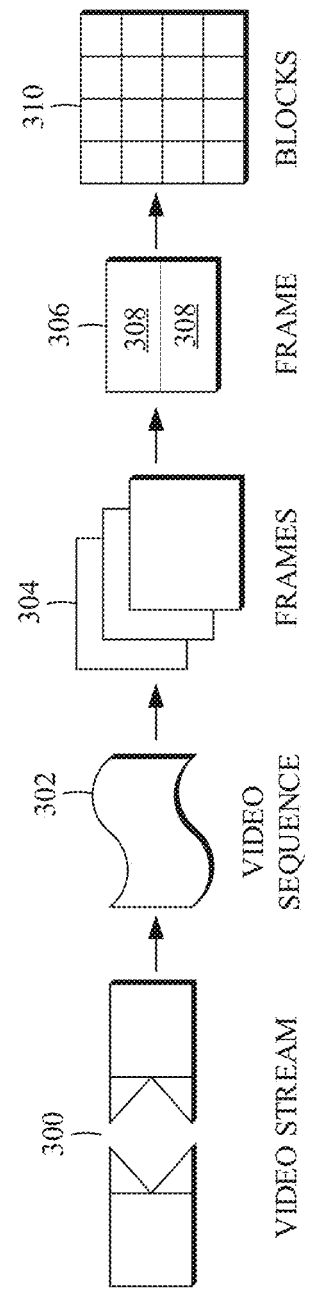
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
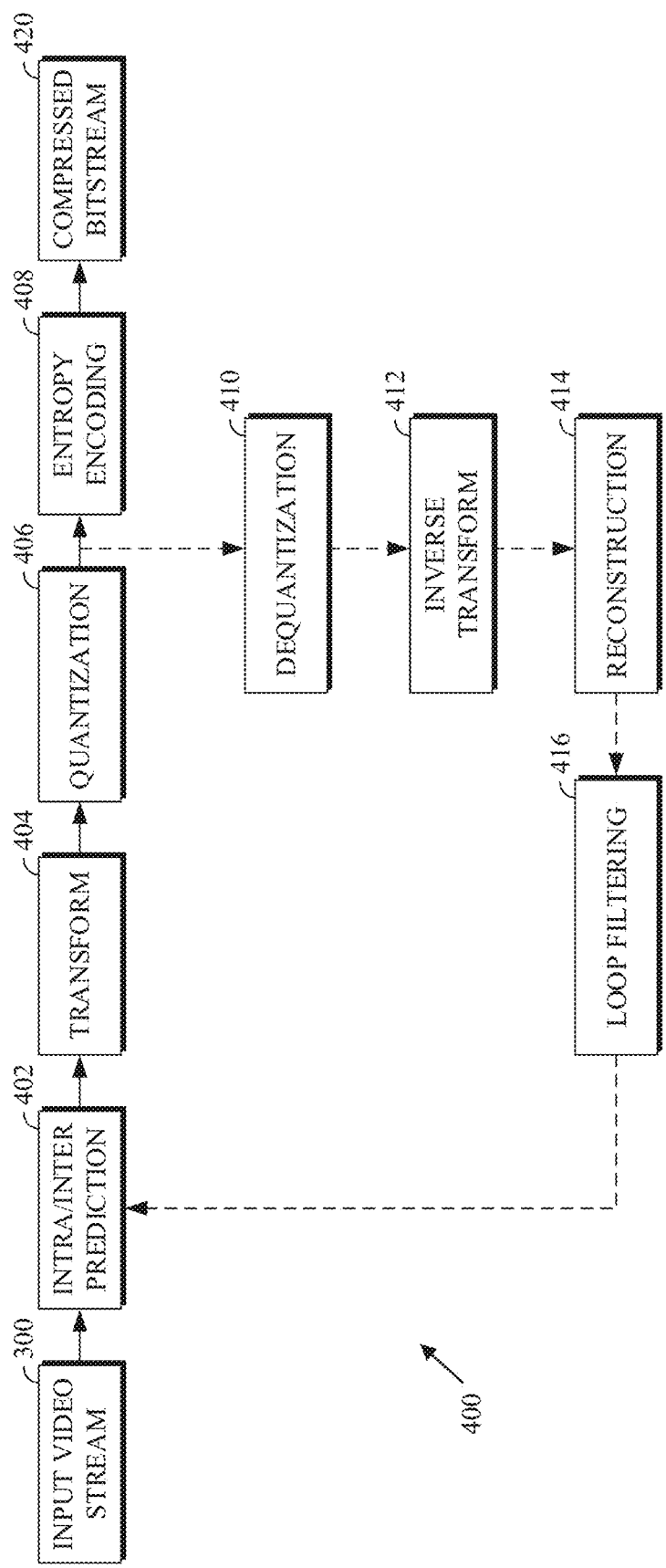
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
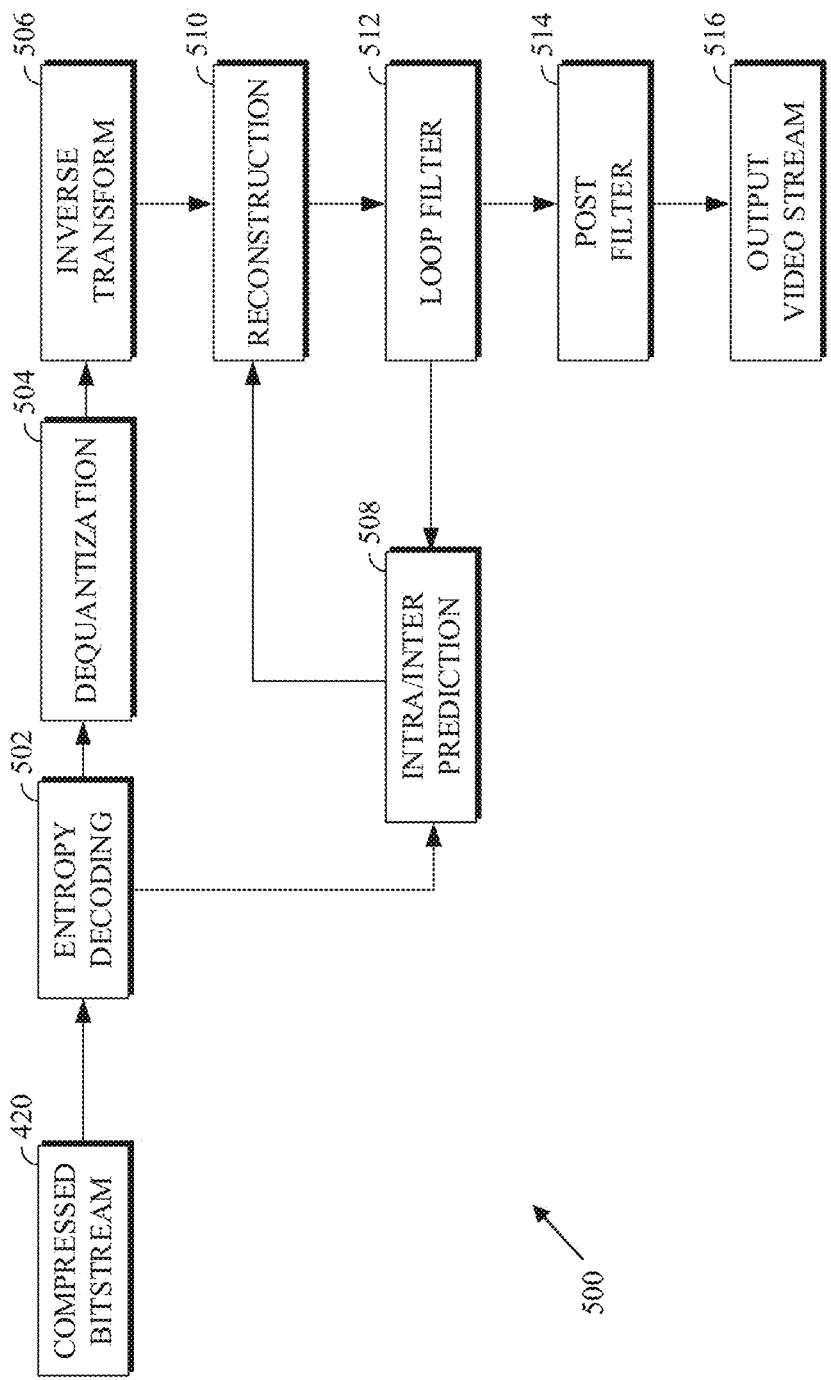
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column), and the identity transform can be applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

Figure 6:
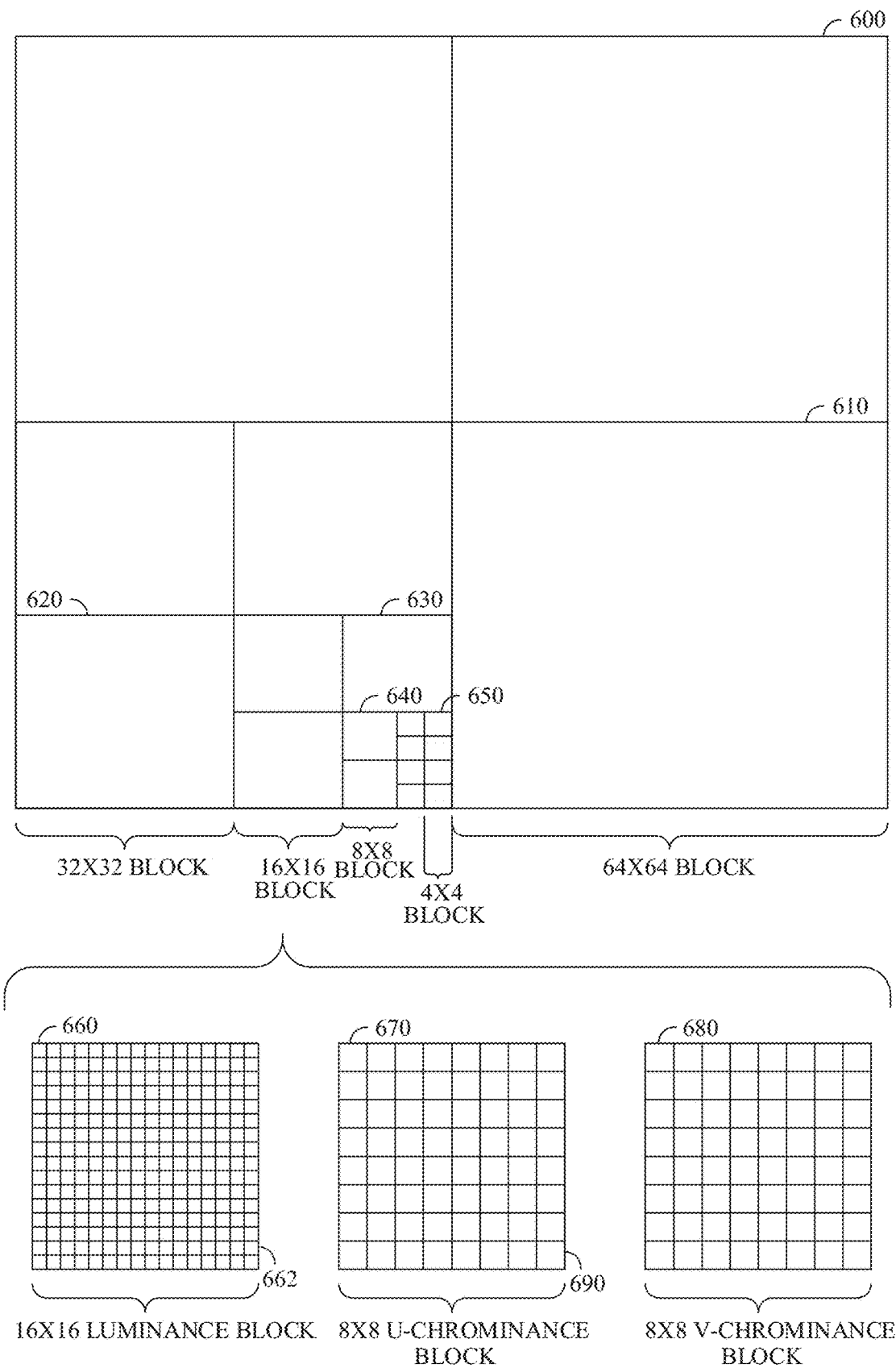
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. For example, a superblock can be 128×128. A superblock can also be referred to as a coding tree block (CTB). While FIG. 6 is explained with respect to a superblock of size 64×64, the description is easily extendable to larger (e.g., 128×128) or smaller superblock sizes.

In an example, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
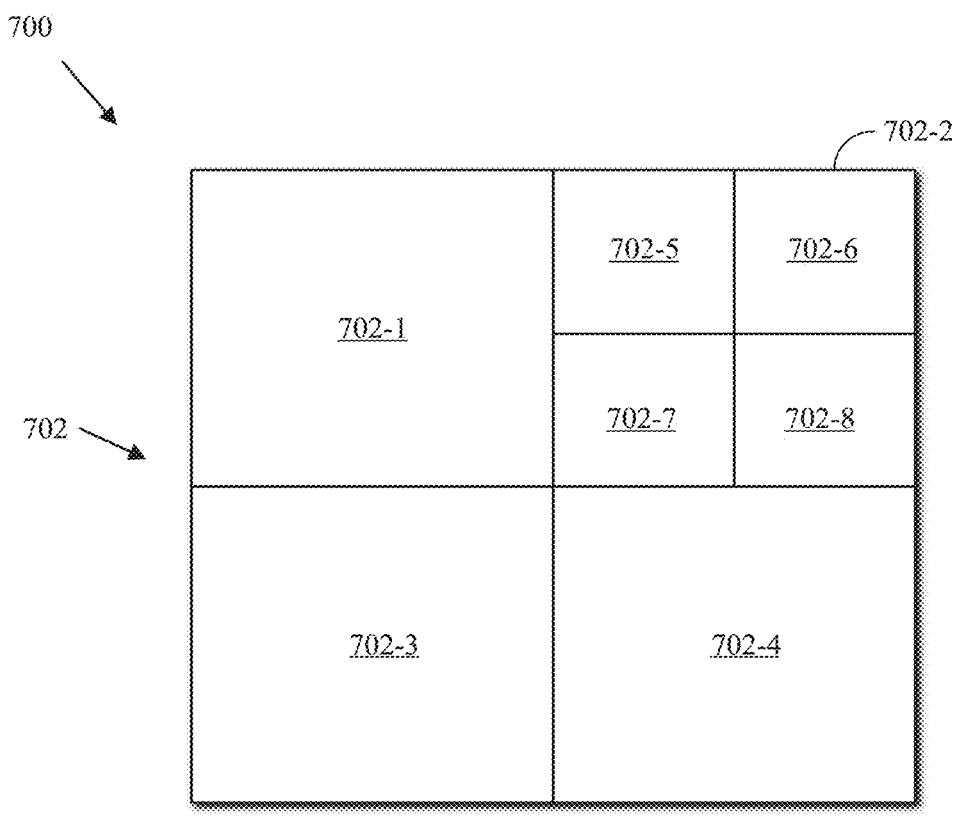
FIG. 7 is a block diagram of an example of a quad-tree representation of a block according to implementations of this disclosure.
Figure 7:
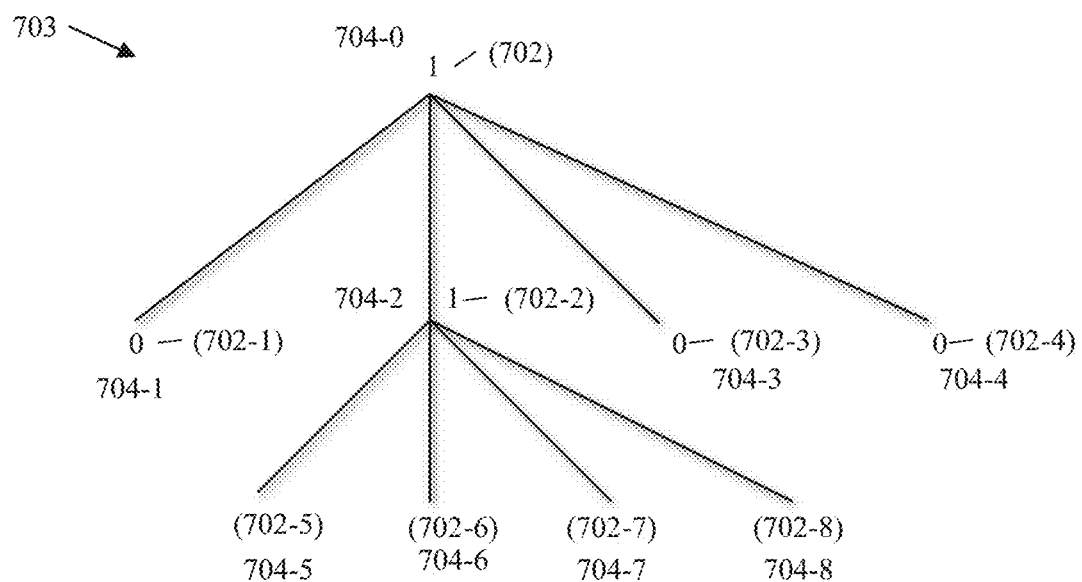

As mentioned above, a superblock can be coded using quad-tree coding. FIG. 7 is a block diagram of an example 700 of a quad-tree representation of a block according to implementations of this disclosure. The example 700 includes a block 702. As mentioned above, the block 702 can be referred to as a superblock or a CTB. The example 700 illustrates a partition of the block 702. However, the block 702 can be partitioned differently, such as by an encoder (e.g., the encoder 400 of FIG. 4).

The example 700 illustrates that the block 702 is partitioned into four blocks, namely, blocks 702-1, 702-2, 702-3, and 702-4. The block 702-2 is further partitioned into blocks 702-5, 702-6, 702-7, and 702-8. As such, if, for example, the size of the block 702 is N×N (e.g., 128×128), then the blocks 702-1, 702-2, 702-3, and 702-4 are each of size N/2×N/2 (e.g., 64×64), and the blocks 702-5, 702-6, 702-7, and 702-8 are each of size N/4×N/4 (e.g., 32×32). If a block is partitioned, it is partitioned into four equally sized, non-overlapping square sub-blocks.

A quad-tree data representation is used to describe how the block 702 is partitioned into sub-blocks, such as blocks 702-1, 702-2, 702-3, 702-4, 702-5, 702-6, 702-7, and 702-8. A quad-tree 703 of the partition of the block 702 is shown. Each node of the quad-tree 703 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quad-tree, a node either has four child nodes or has no child nodes. A node that has no child nodes corresponds to a block that is not split further. Each of the child nodes of a split block corresponds to a sub-block.

In the quad-tree 703, each node corresponds to a sub-block of the block 702. The sub-block is shown between parentheses. For example, a node 704-1, which has a value of 0, corresponds to the block 702-1.

A root node 704-0 corresponds to the block 702. As the block 702 is split into four sub-blocks, the value of the root node 704-0 is the split bit (e.g., 1). At an intermediate level, the flags indicate whether a sub-block of the block 702 is further split into four sub-sub-blocks. In this case, a node 704-2 includes a flag of "1" because the block 702-2 has been split into the blocks 702-5, 702-6, 702-7, and 702-8. Each of nodes 704-1, 704-3, and 704-4 includes a flag of "0" because the corresponding blocks are not split. As nodes 704-5, 704-6, 704-7, and 704-8 are at a bottom level, no flag of "0" or "1" is necessary for those nodes because of corresponding CUs. That the blocks 702-5, 702-6, 702-7, and 702-8 are not split further can be inferred from the absence of additional flags corresponding to these blocks.

The quad-tree data representation for the quad-tree 703 can be represented by the binary data of "10100," where each bit represents a node 704 of the quad-tree 703. The binary data indicates the partitioning of the block 702 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quad-tree 703 can be used as the bases for prediction. That is, prediction can be performed for each of the blocks 702-1, 702-5, 702-6, 702-7, 702-8, 702-3, and 702-4, referred to herein as coding blocks. As mentioned with respect to FIG. 6, the coding block can be a luminance block or a chrominance block. It is noted that, in an example, the superblock partitioning can be determined with respect to luminance blocks. The same partition can be used with the chrominance blocks.

A prediction type (e.g., intra- or inter-prediction) is determined at the coding block (e.g., a block 702-1, 702-5, 702-6, 702-7, 702-8, 702-3, or 702-4) level. That is, a coding block is the decision point for prediction.

Figures 8A, 8B:
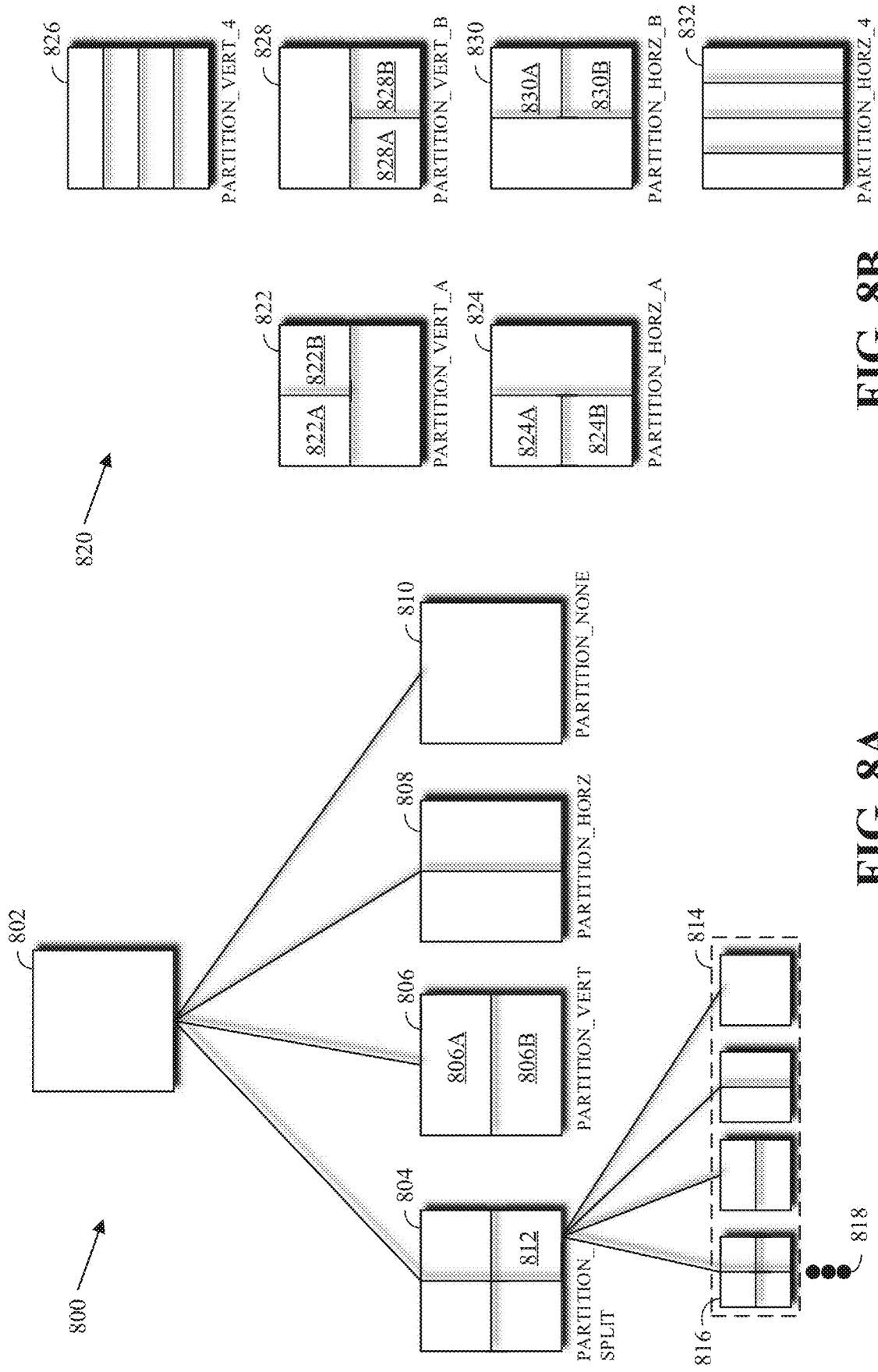
FIG. 8A is a block diagram of an example of recursive partitioning of a coding block into prediction blocks.
FIG. 8B is a block diagram of an example of extended partition types of a coding block according to implementations of this disclosure.

FIG. 8A is a block diagram of an example 800 of recursive partitioning of a coding block. The example 800 includes a coding block 802. Inter- or intra-prediction is performed with respect to the coding block 802. That is, the coding block 802 can be partitioned (e.g., divided, split, or otherwise partitioned) into one or more prediction units (PUs) according to a partition type, such as one of the partition types described herein. Each PU can be predicted using inter- or intra-prediction. In an example, the process described with respect to the example 800 can be performed (e.g., implemented) by an intra/inter-prediction stage, such as the intra/inter-prediction stage 402 of the encoder 400 of FIG. 4.

The coding block 802 can be a chrominance block. The coding block 802 can be a luminance block. In an example, a partition is determined for a luminance block, and a corresponding chrominance block uses the same partition as that of the luminance block. In another example, a partition of a chrominance block can be determined independently of the partition of a luminance block.

The example 800 illustrates a recursive partition search of the coding block 802. The recursive search is performed in order to determine the partition that results in the optimal RD cost. An RD cost can include the cost of encoding both the luminance and the chrominance blocks corresponding to a block.

The example 800 illustrates four partition types that may be available at an encoder. A partition type 804 (also referred to herein as the PARTITION_SPLIT partition type and partition-split partition type) splits the coding block 802 into four equally sized square sub-blocks. For example, if the coding block 802 is of size N×N, then each of the four sub-blocks of the PARTITION_SPLIT partition type is of size N/2×N/2. Each of the four sub-blocks resulting from the partition type 804 is not itself a prediction unit/block.

A partition type 806 (also referred to herein as the PARTITION_VERT partition type) splits the coding block 802 into two adjacent rectangular prediction units, each of size N×N/2. A partition type 808 (also referred to herein as the PARTITION_HORZ partition type) splits the coding block 802 into two adjacent rectangular prediction units, each of size N/2×N. A partition type 810 (also referred to herein as the PARTITION_NONE partition type and partition-none partition type) uses one prediction unit for the coding block 802 such that the prediction unit has the same size (i.e., N×N) as the coding block 802.

For brevity, a partition type may simply be referred to herein by its name only. For example, instead of using "the PARTITION_VERT partition type," "the PARTITION_VERT" may be used herein. As another example, instead of "the partition-none partition type," "the partition-none" may be used. Additionally, uppercase or lowercase letters may be used to refer to partition type names. As such, "PARTITION_VERT" and "partition-vert" refer to the same partition type.

Except for the partition type 804, none of the other partitions can be split further. As such, the partition types 806-810 can be considered end points. Each of the sub-blocks of a partition (according to a partition type) that is not an end point can be further partitioned using the available partition types. As such, partitioning can be further performed for square coding blocks. The sub-blocks of a partition type that is an end point are not partitioned further. As such, further partitioning is possible only for the sub-blocks of the PARTITION_SPLIT partition type.

As mentioned above, to determine the minimal RD cost for the coding block 802, the coding block is partitioned according to the available partition types, and a respective cost (e.g., an RD cost) of encoding the block based on each partition is determined. The partition type resulting in the smallest RD cost is selected as the partition type to be used for partitioning and encoding the coding block.

The RD cost of a partition is the sum of the RD costs of each of the sub-blocks of the partition. For example, the RD cost associated with the PARTITION_VERT (i.e., the partition type 806) is the sum of the RD cost of a sub-block 806A and the RD cost of a sub-block 806B. The sub-blocks 806A and 806B are prediction units. In an example, identifiers, such as identifiers 0, 1, 2, and 4, can be associated, respectively, with the PARTITION_NONE, PARTITION- _HORZ, PARTITION_VERT, and PARTITION_SPLIT. Other identifiers are possible. Other ways of communicating the partition type to a decoder are possible.

To determine an RD cost associated with a prediction block, an encoder can predict the prediction block using at least some of the available prediction modes (i.e., available inter- and intra-prediction modes). In an example, for each of the prediction modes, a corresponding residual is determined, transformed, and quantized to determine the distortion and the rate (in bits) associated with the prediction mode. As mentioned, the partition type resulting in the smallest RD cost can be selected. Selecting a partition type can mean, inter alia, encoding in a compressed bitstream, such as the compressed bitstream 420 of FIG. 4, the partition type. Encoding the partition type can mean encoding an identifier corresponding to the partition type. Encoding the identifier corresponding to the partition type can mean entropy encoding, such as by the entropy encoding stage 408 of FIG. 4, the identifier.

To determine the RD cost corresponding to the PARTITION_SPLIT (i.e., the partition type 804), a respective RD cost corresponding to each of the sub-blocks, such as a sub-block 812, is determined. As the sub-block 812 is a square sub-block, the sub-block 812 is further partitioned according to the available partition types to determine a minimal RD cost for the sub-block 812. As such, the sub-block 812 is further partitioned as shown with respect to partitions 814. As the sub-blocks of a partition 816 (corresponding to the PARTITION_SPLIT) are square sub-blocks, the process repeats for each of the sub-blocks of the partition 816, as illustrated with an ellipsis 818, until each of a smallest square sub-block size is reached. The smallest square sub-block size corresponds to a block size that is not partitionable further. In an example, the smallest square sub-block size, for a luminance block, is a 4×4 block size.

As such, determining an RD cost of a square block can be regarded as a bottom-up search. That is, for example, to determine the RD cost of a PARTITION_SPLIT of a 16×16 coding block, the RD cost of each of the four 8×8 sub-blocks is determined; to determine the RD cost of a PARTITION_SPLIT of a 4×4 coding block, the RD cost of each of the four 4×4 sub-blocks is determined. As such, a square block can be recursively partitioned, based on a quad-tree partitioning, into sub-blocks using the partition-split type.

As mentioned above, more partition types than those described with respect to FIG. 8A can be available at a codec. FIG. 8B is a block diagram of an example 820 of extended partition types of a coding block according to implementations of this disclosure. The term "extended" in this context can mean "additional."

A partition type 822 (also referred to herein as the PARTITION_VERT_A) splits an N×N coding block into two horizontally adjacent square blocks, each of size N/2×N/2, and a rectangular prediction unit of size N×N/2. A partition type 828 (also referred to herein as the PARTITION_VERT_B) splits an N×N coding block into a rectangular prediction unit of size N×N/2 and two horizontally adjacent square blocks, each of size N/2×N/2.

A partition type 824 (also referred to herein as the PARTITION_HORZ_A) splits an N×N coding block into two vertically adjacent square blocks, each of size N/2×N/2, and a rectangular prediction unit of size N/2×N. A partition type 830 (also referred to herein as the PARTITION_HORZ_B) splits an N×N coding block into a rectangular prediction unit of size N/2×N and two vertically adjacent square blocks, each of size N/2×N/2.

A partition type 826 (also referred to herein as the PARTITION_VERT_4) splits an N×N coding block into four vertically adjacent rectangular blocks, each of size N×N/4. A partition type 832 (also referred to herein as the PARTITION_HORZ_4) splits an N×N coding block into four horizontally adjacent rectangular blocks, each of size N/4×N.

As mentioned above, a recursive partition search (e.g., based on a quad-tree partitioning) can be applied to square sub-blocks, such as sub-blocks 822A, 822B, 824A, 824B, 828A, 828B, 830A, and 830B.

Identifiers can be associated with each of the partition types of the example 820. In an example, identifiers 4-9 can be associated, respectively, with the PARTITION_HORZ_A, PARTITION_HORZ_B, PARTITION_VERT_A, PARTITION_VERT_B, PARTITION_HORZ_4, and PARTITION_VERT_4. Other identifiers are possible.

As shown in the example 820, instead of the four possible partition types of the example 800, 10 possible partition types (the partition types of the example 800 and the partition types of the example 820) can be available at an encoder. The complexity of an encoder that uses the 10 partition types can be 2.5 times that of an encoder that uses only the four partition types.

Figure 9:
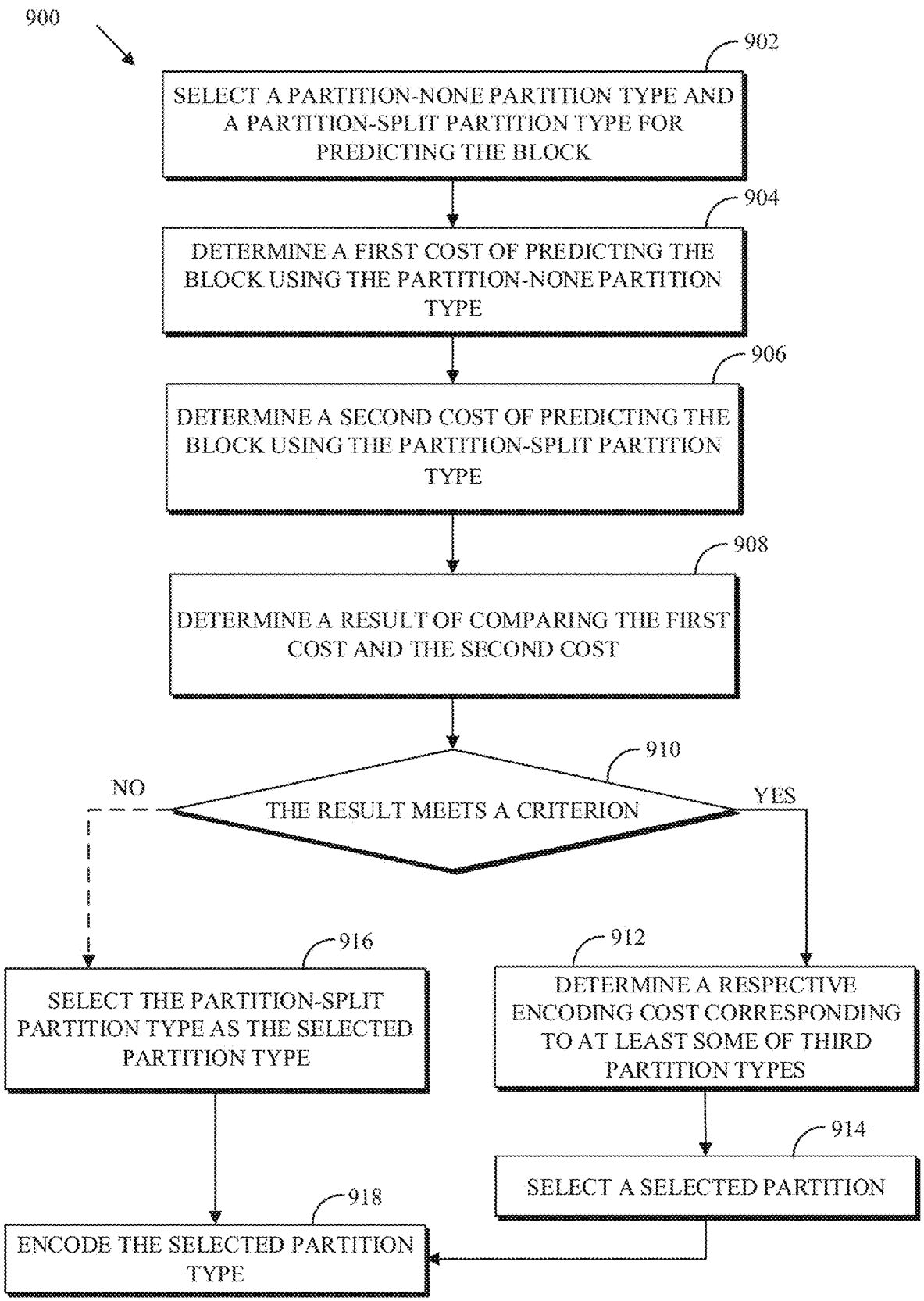
FIG. 9 is a flowchart of a process for predicting a coding block of a video frame according to implementations of this disclosure.

FIG. 9 is a flowchart of a process 900 for predicting a coding block of a video frame according to implementations of this disclosure. The coding block is a current block being encoded. The process 900 can be implemented by an encoder, such as the encoder 400 of FIG. 4. For example, the process 900 can be performed in whole or in part by the intra/inter-prediction stage 402 of the encoder 400.

Implementations of the process 900 can be performed by storing instructions in a memory, such as the memory 204 of the transmitting station 102, to be executed by a processor, such as the CPU 202, for example.

The process 900 can be implemented using specialized hardware or firmware. Some computing devices can have multiple memories, multiple processors, or both. The steps or operations of the process 900 can be distributed using different processors, memories, or both. For simplicity of explanation, the process 900 is depicted and described as a series of operations. However, the teachings in accordance with this disclosure can occur in various orders and/or concurrently. Additionally, operations in accordance with this disclosure may occur with other operations not presented and described herein. Furthermore, not all illustrated steps or operations may be used to implement a method in accordance with the disclosed subject matter.

The process 900 uses a two-stage partition search for a coding block, such as the block 802 of FIG. 8. Using the two-stage partitioning of a coding block, an encoder can adapt the processing unit (e.g., prediction unit) sizes according to the content characteristics of the coding block. Using the two-stage partition search, an encoder can advantageously narrow down the effective search range (over all available partition types) in a first pass and can conduct, in a second pass, an extensive search over only the most likely used partition range of the first pass. In the first pass, square partitions, as described below, are checked.

It is noted that even though a coding block can be partitioned into four (as described with respect to FIG. 8A) or 10 different partitions (as described with respect to the partitions of FIGS. 8A and 8B) to best fit the video signal of the coding block, the process 900 uses a recursive quad-tree partition that goes through the square coding block sizes. As such, in a first stage, the process 900 determines encoding costs (e.g., RD costs) associated with square blocks only. As such, in a first stage, the process 900 determines RD costs associated with only the PARTITION_SPLIT and the PARTITION_NONE partition types. The PARTITION_SPLIT partition type is applied recursively until a smallest square sub-block size is reached. Available partition types, other than the PARTITION_SPLIT and the PARTITION_NONE partition types, are referred to, collectively, as third partition types.

In an example, the third partition types include the PARTITION_VERT and the PARTITION_HORZ partition types. In an example, the third partition types include the PARTITION_VERT, the PARTITION_HORZ, the PARTITION_HORZ_A, the PARTITION_HORZ_B, the PARTITION_VERT_A, the PARTITION_VERT_B, the PARTITION_HORZ_4, and the PARTITION_VERT_4 partition types. In another example, the third partition types can include more, fewer, or other partition types.

The process 900 can be summarized as follows. In a first pass (i.e., a first stage), the process 900 determines encoding costs (e.g., RD costs) for square partitions only. In a second pass (i.e., a second stage), if the PARTITION_SPLIT of the first pass results in a better encoding cost than the PARTITION_NONE, then the encoder need not determine respective encoding costs for the third partition types. As such, a full partition search can be bypassed, and a full partition search can be performed with respect to the smaller block sizes. As the first stage is an intermediate state, during (and at the end of) the first stage, the process 900 writes no data (e.g., bits) to a compressed bitstream, such as the compressed bitstream 420 of FIG. 4. In an implementation, the encoding costs are determined in the first pass using limited encoding such as limited prediction options, limited transform coding options, limited quantization options, other limitations on the coding options, or a combination thereof. Illustrative examples of limited encoding include using only four representative intra prediction modes in the first pass out of ten available intra-prediction modes, using an inter-prediction search window that is limited in size, using only the DCT transform, and using predefined transform block sizes. Other limited encoding options can be used in the first pass. In an implementation, the encoding costs are determined without limiting the encoding options.

The process 900 is further explained below with reference to FIGS. 10 and 11.

Figure 10:
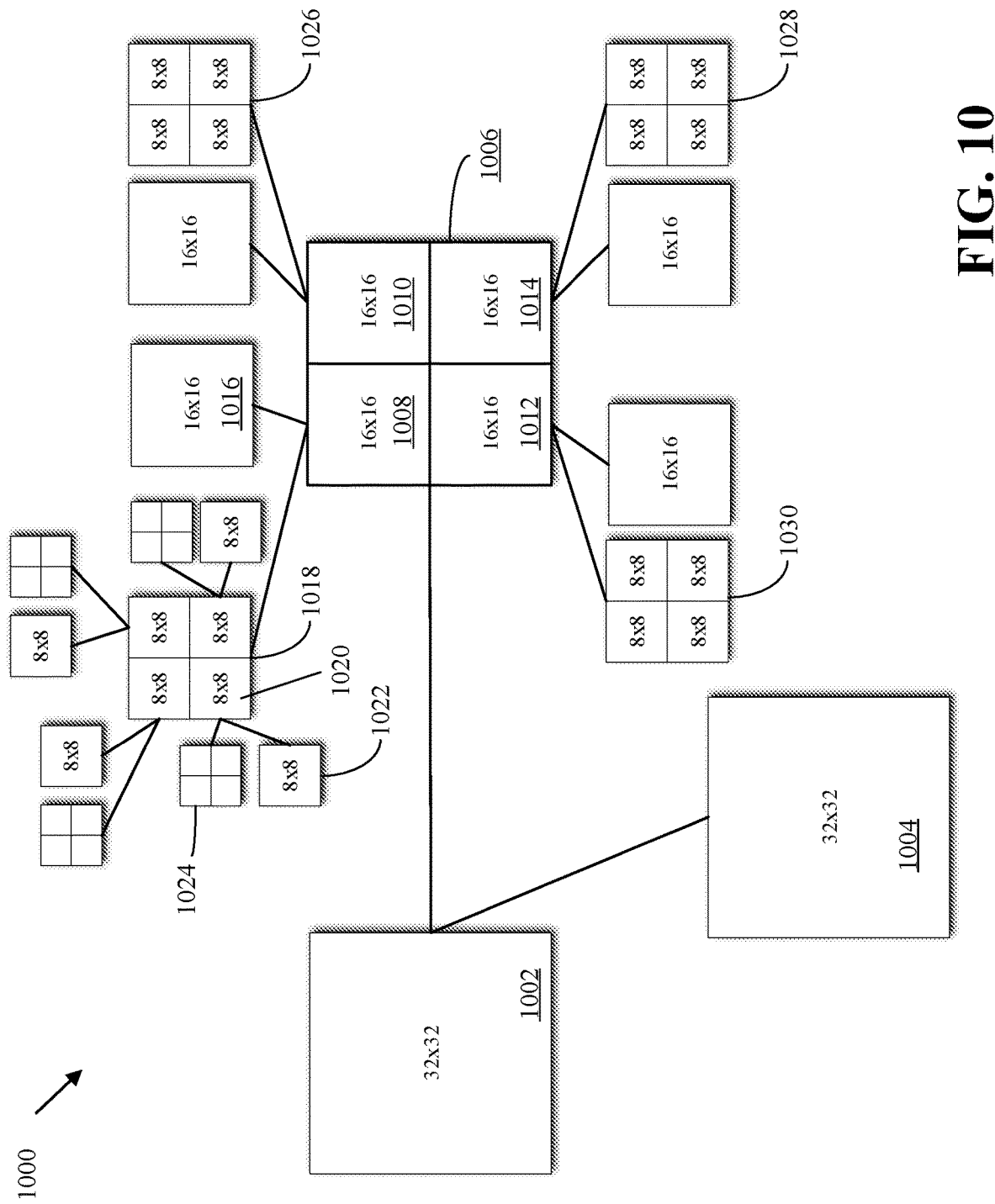
FIG. 10 is a block diagram of an example of a first stage of determining a partition type of a coding block according to implementations of this disclosure.

FIG. 10 is a block diagram of an example 1000 of a first stage of determining a partition type of a coding block according to implementations of this disclosure. The example 1000 includes a coding block 1002. The coding block 1002 can be the coding block 802 of FIG. 8. As such, in an example, the coding block can be of size 128×128. The coding block 1002 can be a sub-block that results from a partitioning (corresponding to the PARTITION_SPLIT partition type), such as the sub-block 812 of FIG. 8. In the example 1000, the coding block 1002 is illustrated as being a 32×32 coding block. As such, the block 1002 can be a coding block that is generated, based on the PARTITION_SPLIT partition type, during the recursive partitioning.

At operation 902, the process 900 selects a partition-none partition type and a partition-split partition type for predicting the block. As described above, the partition-none partition type and the partition-split partition type are selected from a set of partition types that includes the partition-none partition type, the partition-split partition type, and third partition types. As mentioned above, the partition-split (i.e., PARTITION_SPLIT) partition type partitions the coding block into equally sized square sub-blocks. Selecting a partition type can include partitioning the coding block according to the selected partition.

At operation 904, the process 900 determines a first cost of predicting the block using the partition-none partition type. The first cost can be an RD cost of encoding the coding block using the partition-none partition type. At operation 906, the process 900 determines a second cost of predicting the block using the partition-split type. The second cost can be an RD cost of encoding the coding block using the partition-split partition type.

In another example, the first cost and the second cost may not be RD costs. For example, the first cost and the second cost can be based merely on the residual error without considering the number of bits required to encode the residual. The residual error can be a mean square error between the block and a predicted block of the block. The error can be a sum of absolute differences error between the block and the predicted block. Any other suitable error measure can be used or any other suitable cost function metric (e.g., one unrelated to error) can be used.

Referring to FIG. 10, in the first stage, the operation 902 selects the partition-none partition type and the partition-split partition type. As such, the operation 902 partitions the coding block 1002 into a partition 1004 (corresponding to the partition-none partition type) and a partition 1006 (corresponding to the partition-split partition type). As such, the partition 1006 includes sub-blocks 1008-1014, each of size 16×16. At operation 904, the first cost of predicting the coding block 1002 using the partition-none partition type (i.e., the partition 1004) is determined. The partition 1004 corresponds to one prediction unit (PU) that is of the same size as the coding block itself.

At operation 906, the second cost of predicting the coding block 1002 using the partition-split partition type (i.e., the partition 1006) is determined. As mentioned above, to determine the second cost of the partition 1006, a cost corresponding to each of the sub-blocks 1008-1012 is determined and the four costs are added (e.g., summed). As such, to determine the cost of one of the sub-blocks 1008-1012, the operations of the process 900 are recursively applied to each sub-block, such as the sub-block 1008. To reduce the clutter in FIG. 10, only the recursive partition of the sub-block 1008 is shown. However, the same process described with respect to the sub-block 1008 is also performed with respect to each of the sub-blocks 1010-1014. As such, determining the second cost of predicting the block using the partition-split partition type can include recursively partitioning, based on a quad-tree partitioning, the block into sub-blocks using the partition-split partition type.

The sub-block 1008 is partitioned into a partition 1016 using the partition-none partition type and into a partition 1018 using the partition-split partition type. Each of the four sub-blocks of the partition 1018 is of size 8×8. A first cost of predicting the sub-block 1008 (i.e., a prediction unit corresponding to the partition 1016) is determined, and a second cost of predicting the sub-block 1008 (i.e., a total cost of predicting the sub-blocks of the partition 1018) is determined. As described above, to determine the second cost, a cost of each sub-block, such as a sub-block 1020, is determined. As described above, a first cost of predicting the sub-block 1020 is determined based on a partition-none partition type (i.e., a partition 1022), and a second cost is determined based on a partition-split partition type (i.e., a partition 1024). Each of the four blocks of the partition 1024 is of size 4×4. As mentioned above, a block of size 4×4 can be the smallest square sub-block size, if the block is a luminance block. As such, the sub-blocks of the partition 1024 are not split further. For a chrominance block, the smallest square sub-block size can be 2×2.

At each level of the recursion, at operation 908, the process 900 determines a result of comparing the first cost and the second cost. The steps described above can result in a decision, at each square block, of whether to split or not split the square block. That is, the process 900 compares the first cost to the second cost. That is, whether the partition-none partition type or the partition-split partition type is selected is based on a comparison of the first cost to the second cost. Said differently, the recursive process of the first pass indicates the operating points (i.e., operating scales) of various regions of the coding block. An operating point (or operating scale) is indicative of the optimal sub-block sizes that the coding block is to be split into to minimize the encoding cost of the coding block.

The operating scale of a region of a coding block is indicative of whether smaller, finer coding blocks or larger, coarser prediction units are sufficient to predict the block. The smaller, finer coding blocks correspond to performing a finer partition search with respect to the coding blocks corresponding to the partition-split partition type. The larger, coarser prediction units are prediction units that are at the same scale as those corresponding to the partition-none partition type. As such, the partition types of the third partition types result in prediction units of the same scale as those of the partition-none partition type.

Figure 11:
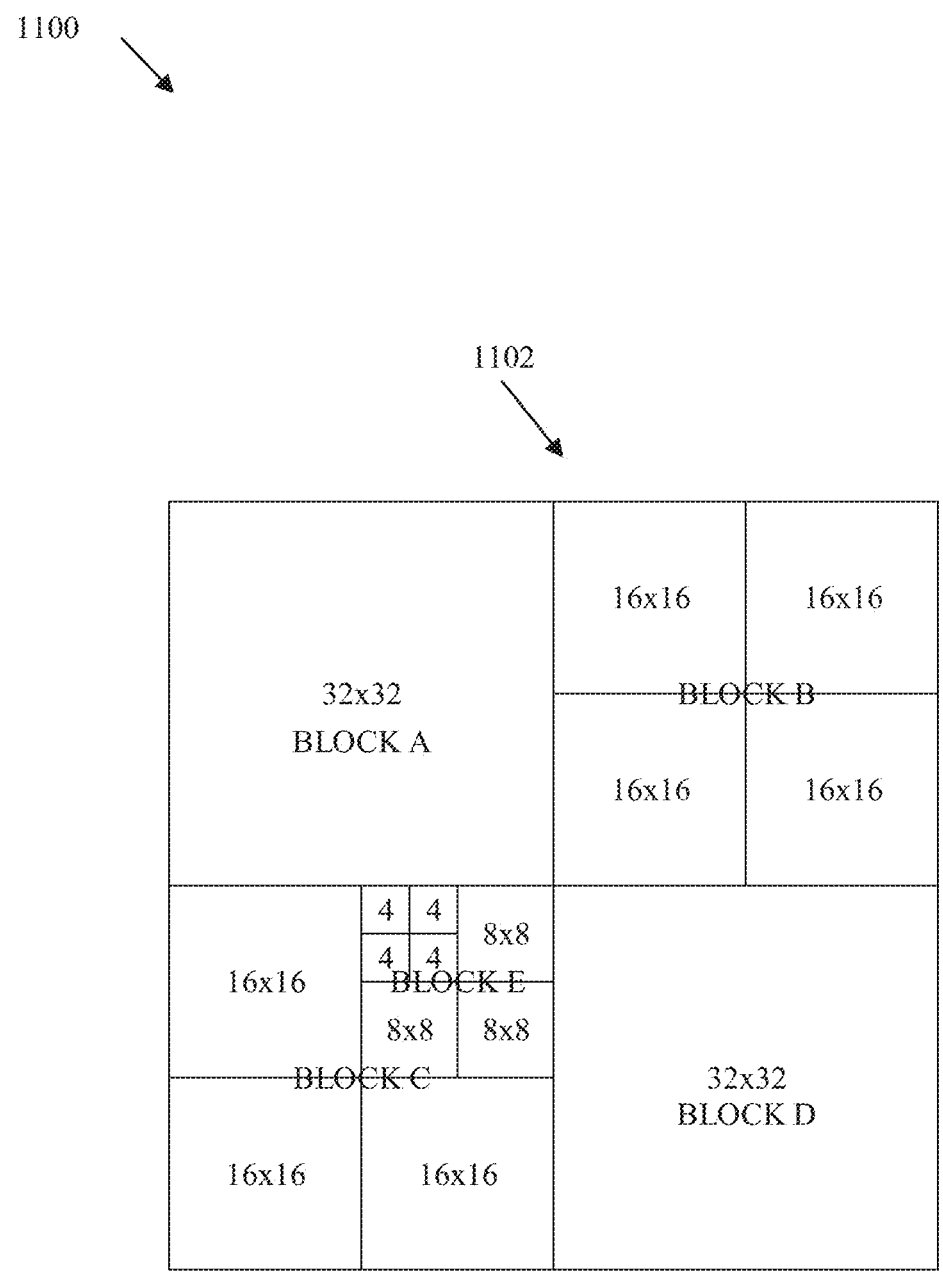
FIG. 11 is a block diagram of an example of a result of a first stage of determining a partition type of a coding block according to implementations of this disclosure.

FIG. 11 is a block diagram of an example 1100 of a result of a first stage of determining a partition type of a coding block according to implementations of this disclosure. The coding block 1102 of the example 1100 is shown as a 64×64 block. However, other block sizes are possible, as described above. The example 1100 illustrates the decisions (i.e., whether to split or not split a square sub-block) as described above with respect to the process 900.

In the first pass, which can include the operations 902-908, the process 900 determines that the first cost associated with the partition-none partition type is greater than the second cost associated with the partition-split partition type. As such, the coding block 1102 is split into four square sub-blocks, each of size 32×32. For ease of reference, the four square sub-blocks are labeled "BLOCK A," "BLOCK B," "BLOCK C," and "BLOCK D."

Additionally, in the first pass, the partition-none partition type is selected for the BLOCK A, the partition-split partition type is selected for the BLOCK B, the partition-split partition type is selected for the BLOCK C, and the partition-none partition type is selected for the BLOCK D. Each of the sub-blocks of the BLOCK B is not split; as such, the process 900 determined that the partition-none partition type is used with each of the sub-blocks of the BLOCK B. The sub-blocks of the BLOCK B are a top-left sub-block, a top-right sub-block, a bottom-left sub-block, and a bottom-right sub-block. The top-left, bottom-left, and bottom-right sub-blocks of the BLOCK C are not split. The partition-split partition type is selected for the top-right sub-block (i.e., a "BLOCK E") of the BLOCK C. Each of the sub-blocks of the BLOCK E is of size 8×8. The partition-split partition type is selected for the top-left sub-block of the BLOCK E, partitioning the sub-block into four sub-blocks, each of size 4×4.

Referring to the process 900 again, the process 900 compares the first cost to the second cost to determine whether a coding block is well enough predicted at larger prediction unit sizes (i.e., corresponding to the partition-none partition type) or whether smaller coding blocks (i.e., corresponding to the partition-split type) are required.

If the first cost of predicting the block (or a sub-block, as the case may be) using the partition-none partition type is smaller than the second cost, the process 900 can determine whether any of the third partition types will result in a better cost than the first cost.

For example, for the coding block 1002 of FIG. 10, if the first cost of the partition 1004 is smaller than the second cost of the partition 1006, then the process 900 checks the third partition types. That is, the process 900 determines a respective encoding cost for partition types of the third partition types. No additional predictions (e.g., determining encoding costs) are then performed by the process 900 with respect to the sub-blocks resulting from the partition-split partition type.

As such, at operation 910, the process 900 determines whether the result of comparing the first cost to the second cost meets a criterion. In an example, the criterion can be indicative of whether the first cost is less than the second cost. If the result meets the criterion, the process 900 proceeds to operation 912. If the result does not meet the criterion, the process 900 proceeds to operation 916.

FIG. 11 is referred to again to illustrate the second pass of the process 900. The second pass can include the operations 910-916.

For the top-left 32×32 block (i.e., the BLOCK A), the process 900 checks at least some of the third partition types at the 32×32 level. In an example, all of the third partition types are checked. Checking a partition type means to determine a respective encoding cost of the BLOCK A based on the partition type. That is, for example, the process 900 determines a respective encoding cost of the BLOCK A based on the PARTITION_VERT partition type (i.e., using two prediction units, each of size 32×16), the PARTITION_HORZ partition type (i.e., using two prediction units, each of size 16×32), the PARTITION_VERT_A partition type (i.e., using two horizontal square prediction units, each of size 16×16, and a rectangular prediction unit of size 32×16), and so on.

In an implementation of the second pass where limited encoding (as described above) is not used in the first pass, the process 900 does not further check recursive partitions for blocks of size 16×16, as encoding costs of 16×16 sub-blocks are already available from the first pass. For example, with respect to the PARTITION_VERT_A partition type, the sub-block 822A of FIG. 8 corresponds to the same 16×16 sub-block 1008 of FIG. 10. In an implementation of the second pass where limited encoding is used in the first pass, the process 900 further checks recursive partitions for blocks of size 16×16.

As such, at the operation 912, the process 900 determines a respective encoding cost corresponding to at least some of the third partition types. At operation 914, the process selects a selected partition type corresponding to a minimal cost amongst the partition-none type and the at least some of the third partition types. That is, the partition type corresponding to the lowest cost (e.g., a rate-distortion value) is selected as the final partition decision for the BLOCK A. The process 900 does not further check recursive partitions of the BLOCK A going down from the 16×16 point (e.g., partition sizes).

With respect to the BLOCK B of FIG. 11, the BLOCK B is split in the first pass (i.e., using the partition-split partition type) into four 16×16 blocks. As such, the process 900 performs the operation 916 with respect to the BLOCK B. That is, the process 900 bypasses additional partition searches at the 32×32 block partition level (as described above with respect to the coding block 1102). Rather, the process 900 goes directly toward (i.e., performs additional partition searches with respect to) the four 16×16 blocks, as described with respect to the coding block 1102. That is, for each of the 16×16 sub-blocks of the BLOCK B, the process 900 performs operations similar to those described above with respect to the BLOCK A. That is, for example, the process 900 determines a respective encoding cost of each 16×16 sub-block of the BLOCK B based on the PARTITION_VERT partition type (i.e., using two prediction units, each of size 16×8), the PARTITION_HORZ partition type (i.e., using two prediction units, each of size 8×16), the PARTITION_VERT_A partition type (i.e., using two horizontal square prediction units, each of size 8×8, and a rectangular prediction unit of size 16×8), and so on. As described above, the process 900 does not further check recursive partitions for blocks of size 8×8 since encoding costs of 8×8 sub-blocks are already available from the first pass.

To reiterate, at the operation 916 (i.e., in the second pass where a coding block is split), and with respect to the coding block 1102, the process 900 bypasses additional partition searches at the 64×64 block partition level. For example, the process 900 does not perform partition searches corresponding to the PARTITION_VERT partition type (i.e., using two prediction units, each of size 64×32), the PARTITION_HORZ partition type (i.e., using two prediction units, each of size 32×64), and so on. That is, the process 900 does not determine coding costs associated with any of the third partition types. That is, the process 900 does not perform any predictions corresponding to partitions of the third partition types. Rather, the process 900, via the operation 916, goes directly toward (i.e., performs additional partition searches with respect to) the four 32×32 blocks (i.e., the BLOCK A, the BLOCK B, the BLOCK C, and the BLOCK D).

Similarly, a 32×32-level check is bypassed for the BLOCK C, as described with respect to the coding block 1102 and the BLOCK B. The process 900 performs operations similar to those described with respect to the sub-blocks of the BLOCK B with respect to three of the 16×16 sub-blocks of the BLOCK C, namely, the top-left, the bottom-left, and the bottom-right sub-blocks of the BLOCK C. That is, the process 900 performs a 16×16-level partition search with respect to each of these sub-blocks. With respect to the top-right 16×16 sub-block of the BLOCK C, the process 900 bypasses additional partition searches at the 16×16 block partition level and performs partition searches at the 8×8 level.

At operation 918, the process 900 encodes the selected partition type. The process 900 encodes the selected partition type in a compressed bitstream, such as the compressed bitstream 420 of FIG. 4. Encoding the selected partition type can mean encoding an identifier of the selected partition type. An identifier of the selected partition type can be as described above. The identifier can be entropy coded by an entropy encoder, such as the entropy encoding stage 408 of FIG. 1n an example, the respective partition sizes of the above neighboring block of the current block and the left neighboring block of the current block can be used as the context for selecting a probability distribution for entropy coding the identifier of the selected partition type.

In an example of the operation 910, the criterion can indicate that the first cost is within a predefined range of the second cost. That is, the criterion can relate to whether the partition-split partition type and the partition-none partition type provide similar encoding costs. In the case where the first cost (associated with the partition-none partition type) is less than the second cost (associated with the partition-split partition type), but the difference between the first cost and the second cost is within a predefined range, the process 900 nevertheless selects to split the coding block (i.e., the process 900 selects the partition-split partition type).

In an example, if the difference between the first cost and the second cost is a fraction (e.g., ⅛ or other fraction) of the second cost, then the coding block is partitioned (i.e., the partition-split partition type is selected). As such, for example, if (second cost−first cost)<(second cost/8), then the partition-split partition type is selected for the coding block. As such, in situations where the partition-none and the partition-split partition types result in similar encoding costs for a coding block, then, in the second pass, an extensive partition search is performed for the coding block. As such, when the first cost and the second cost are similar, the process 900 can favor quality (e.g., better prediction and/or higher bit rate) over performance (e.g., increased computation time associated with partition search).

As a person skilled in the art can appreciate, the two-stage process described with respect to FIG. 9 can be extended to be a multi-stage process. Given a set of available partition types, at each stage of the multi-stage partition search, some of the available partition types are skipped (i.e., not searched, not examined, not tested, not checked, encoding costs not calculated, or otherwise skipped). That is, given a coding block, no prediction and/or encoding cost determination are performed for the coding block using a partition type that is skipped. In an n-stage partition search, in each pass p=1, 2, . . . , n−1, only square partitions are checked. In the nth pass, non-square partitions are checked.

A three-stage partition search of a 64×64 (128×128) coding block is now used to illustrate the multi-stage partition search. In a first pass, square partitions (i.e., the partition-none and the partition-split partition types) are checked. However, with respect to the partition-split partition type, instead of the recursive partitioning as described above, a level is skipped (e.g., bypassed). That is, instead of partitioning the 64×64 (128×128) coding block into four 32×32 (64×64) coding blocks, the 64×64 (128×128) coding block is partitioned into 16 16×16 (32×32) coding blocks; and instead of partitioning each of the 16 16×16 (32×32) coding blocks into four 8×8 (16×16) coding blocks, a 16×16 (32×32) coding block is partitioned into 16 4×4 (8×8) coding blocks. As such, the partition-split partition type constitutes a skip-level recursive partitioning of the block.

As a result of the first pass, a range of block sizes (based on partition types) is determined to be tested in the second pass. As such, the two-stage process described above with respect to FIG. 9 can be used in the range selected by the first pass of the three-stage partition. That is, in a second pass of the three-stage partition search, square partitions (i.e., the partition-none and the partition-split partition types) are checked within the range decided by the first pass, as described with respect to the first pass of the two-stage partition search process of FIG. 9. The third pass of the three-stage partition search corresponds to the second pass of the two-stage partition search.

Reference is now made to FIG. 10 to illustrate the three-stage partition search process with respect to a coding block 1002 (e.g., a coding block of size 32×32). As mentioned above, in the first pass of the three-stage process, the 16×16 level (i.e., the partition 1006) is skipped. Instead, the first pass determines a first cost associated with the partition 1004 and a second cost that is the sum of the respective costs of the partition 1018 and partitions 1026, 1028, and 1030. As mentioned above, a decision is associated with each square block, which indicates whether the square block is or is not split (i.e., partitioned into square sub-blocks).

Each of the partitions 1018, 1026, 1028, and 1030 corresponds to a pixel region of the coding block 1002. The partition 1018 corresponds to a top-left pixel region of the coding block 1002, the partition 1026 corresponds to a top-right pixel region of the coding block 1002, the partition 1030 corresponds to a bottom-left pixel region of the coding block 1002, and the partition 1028 corresponds to a bottom-right pixel region of the coding block 1002.

In an example, if any of the pixel regions (e.g., the partition 1018) of the coding block 1002 is determined to be using a mix of 8×8 and 4×4 prediction units, then a 16×16 partition for that pixel region (e.g., the sub-block 1008) can be assumed to be too large for that pixel region. As such, in the second pass, third partition types can be skipped for the coding block 1002, and additional square partition searches for the coding block can be performed as described with respect to FIG. 9. On the other hand, if 8×8 and 4×4 prediction units are not used for any of the partitions 1018, 1026, 1028, and 1030, then the third partition types are tested for the coding block 1002.

Figure 12:
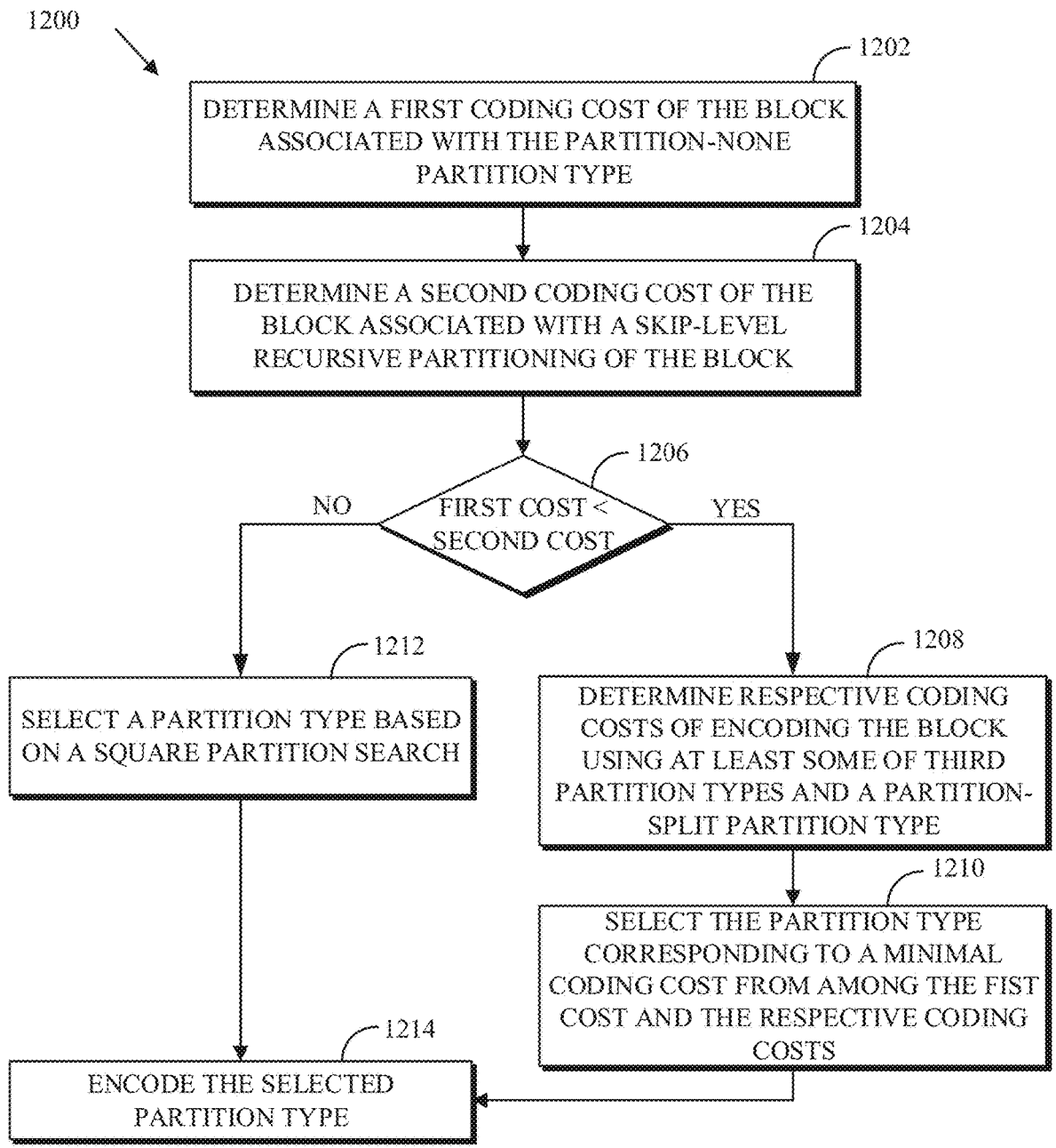
FIG. 12 is a flowchart of a process for predicting a coding block of a video frame according to implementations of this disclosure.

Accordingly, FIG. 12 is a flowchart of a process 1200 for predicting a coding block of a video frame according to implementations of this disclosure. The process 1200 uses a multi-stage prediction search for predicting the coding block. The process 1200 can be implemented by an encoder, such as the encoder 400 of FIG. 4. As described above, the encoder can include, or have available, several partition types. The partition types include a partition-none partition type, a partition-split partition type, and third partition types. The process 1200 determines a partition type to be used for encoding the block.

At operation 1202, the process 1200 determines a first coding cost of the block associated with the partition-none partition type. At operation 1204, the process 1200 determines a second coding cost of the block associated with a skip-level recursive partitioning. At operation 1206, the process 1200 determines whether the first cost is smaller than the second cost. If the first cost is smaller than the second cost, the process 1200 proceeds to operation 1208; otherwise, the process 1200 proceeds to operation 1212.

At the operation 1208, the process 1200 determines respective coding costs of encoding the block using at least some of the third partition types and the partition-split partition type. However, when using the partition-split partition type, the process 1200 does not recursively traverse beyond the levels checked in the first pass. That is, for example, in checking the partition-split partition type with respect to the coding block 1002 of FIG. 10, the sub-blocks 1008-1014 are recursively partitioned.

At operation 1210, the process 1200 selects the partition type corresponding to a minimal coding cost from among the first cost and the respective coding costs. At operation 1214, the process 1200 encodes the selected partition type, such as described with respect to the operation 918 of FIG. 9.

At the operation 1212, the process 1200 selects a partition type based on a square partition search of the block. That is, at the operation 1212, the process 1200 can perform, with respect to the block, the two-stage process described in FIG. 9. From the operation 1212, the process 1200 proceeds to the operation 1214.

A decoder, such as the decoder 500 of FIG. 5, can receive the encoded selected partition type in a compressed bitstream, such as the compressed bitstream 420 of FIG. 5. The selected partition type can be received in a header of a coding block (i.e., a current block) to be decoded by the decoder. The decoder can decode and use the selected partition type to determine prediction units for the current block. As described with respect to FIG. 5, the decoder can decode one or more residual blocks corresponding to the prediction units. The decoder can reconstruct the current block using the residual blocks and previously reconstructed blocks.

For simplicity of explanation, the processes 900 and 1200 are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for predicting a block of size N×N of a video frame, comprising:
    selecting a partition-none partition type and a partition-split partition type for predicting the block,
        wherein the partition-none partition type and the partition-split partition type are selected from a set of partition types comprising the partition-none partition type, the partition-split partition type, and third partition types, the partition types being a same level partitions,
        wherein the partition-none partition type includes one prediction unit of size N×N corresponding to the block of size N×N, and
        wherein the partition-split partition type partitions the block into equally sized square sub-blocks, each of square sub-blocks having a size of N/2×N/2;
    determining a first cost of predicting the block using the partition-none partition type;
    determining a second cost of predicting the block using the partition-split partition type;
    determining a result of comparing the first cost and the second cost;
    on condition that the result meets a criterion indicating that the partition-none partition type is preferred over the partition-split partition type:
        determining a respective encoding cost corresponding to at least some of the third partition types; and
        selecting a selected partition type corresponding to a minimal cost amongst the partition-none partition type and the at least some of the third partition types; and
    encoding, in a compressed bitstream, the selected partition type.

2. The method of claim 1, further comprising:
    on condition that the result does not meet the criterion:
        selecting the partition-split partition type as the selected partition type.

3. The method of claim 1, wherein determining the second cost of predicting the block using the partition-split partition type comprises:
    recursively partitioning, based on a quad-tree partitioning, the block into sub-blocks using the partition-split partition type.

4. The method of claim 1, wherein the third partition types comprise a partition_vert partition type and a partition_horz partition type.

5. The method of claim 4, wherein the third partition types further comprise a partition_horz_a partition type, a partition_horz_b partition type, a partition_vert_a partition type, a partition_vert_b partition type, a partition_horz_4 partition type, and a partition_vert_4 partition type.

6. The method of claim 1, wherein the block has a size of 128×128.

7. The method of claim 1, wherein the block has a size of 64×64.

8. The method of claim 1, wherein the criterion comprises the first cost being less than the second cost.

9. The method of claim 1, wherein the criterion comprises the first cost being within a predefined range of the second cost.

10. An apparatus for predicting a block of size N×N of a video frame, comprising:
    a memory; and
    a processor, the processor configured to execute instructions stored in the memory to:
        select a partition-none partition type and a partition-split partition type for predicting the block,
            wherein the partition-none partition type and the partition-split partition type are selected from a set of partition types comprising the partition-none partition type, the partition-split partition type, and third partition types,
            wherein the partition-none partition type includes one prediction unit of size N×N corresponding to the block of size N×N, and
            wherein the partition-split partition type partitions the block into equally sized square sub-blocks, each of square sub-blocks having a size of N/2×N/2;
        determine a first cost of predicting the block using the partition-none partition type;
        determine a second cost of predicting the block using the partition-split partition type;
        determine a result of comparing the first cost and the second cost;
        on condition that the result meets a criterion indicating that the partition-none partition type is preferred over the partition-split partition type:

determine a respective encoding cost corresponding to at least some of the third partition types; and select a selected partition type corresponding to a minimal cost amongst the partition-none partition type and the at least some of the third partition types.

11. The apparatus of claim 10, wherein the instructions further comprise:

on condition that the result does not meet the criterion:

selecting the partition-split partition type as the selected partition type.

12. The apparatus of claim 10, wherein determining the second cost of predicting the block using the partition-split partition type comprises:

recursively partitioning, based on a quad-tree partitioning, the block into sub-blocks using the partition-split partition type.

13. The apparatus of claim 10, wherein the third partition types comprise a partition_vert partition type and a partition_horz partition type.

14. The apparatus of claim 10, wherein the third partition types further comprise a partition_horz_a partition type, a partition_horz_b partition type, a partition_vert_a partition type, a partition_vert_b partition type, a partition_horz_4 partition type, and a partition_vert_4 partition type.

15. The apparatus of claim 10, wherein the block has a size of 128×128.

16. The apparatus of claim 10, wherein the block has a size of 64×64.

17. The apparatus of claim 10, wherein the criterion comprises the first cost being less than the second cost.

18. The apparatus of claim 10, wherein the criterion comprises the first cost being within a predefined range of the second cost.

19. An apparatus for predicting a block of size N×N of a video frame, comprising:

a memory; and a processor, the processor configured to execute instructions stored in the memory, the instructions comprising:

determining a partition type, from partition types comprising a partition-none partition type, a partition-split partition type, and third partition types, for predicting the block by operations comprising:

determining a first coding cost of the block associated with the partition-none partition type, wherein the partition-none partition type includes one prediction unit of size N×N corresponding to the block of size N×N;

determining a second coding cost of the block associated with a skip-level recursive partitioning, wherein the skip-level recursive partitioning partitions the block into square sub-blocks, and wherein each sub-block having a size that is less than N/2×N/2;

on condition that the first coding cost is smaller than the second coding cost indicating that the partition-none partition type is preferred over the skip-level recursive partitioning:

determining respective coding costs of encoding the block using at least some of the third partition types and the partition-split partition type; and selecting the partition type corresponding to a minimal coding cost from among the first coding cost and the respective coding costs; and encoding, in a compressed bitstream, the partition type.

20. The apparatus of claim 19, wherein the third partition types comprise a partition_vert partition type and a partition_horz partition type.

* * * * *